Patented July 24, 1923.

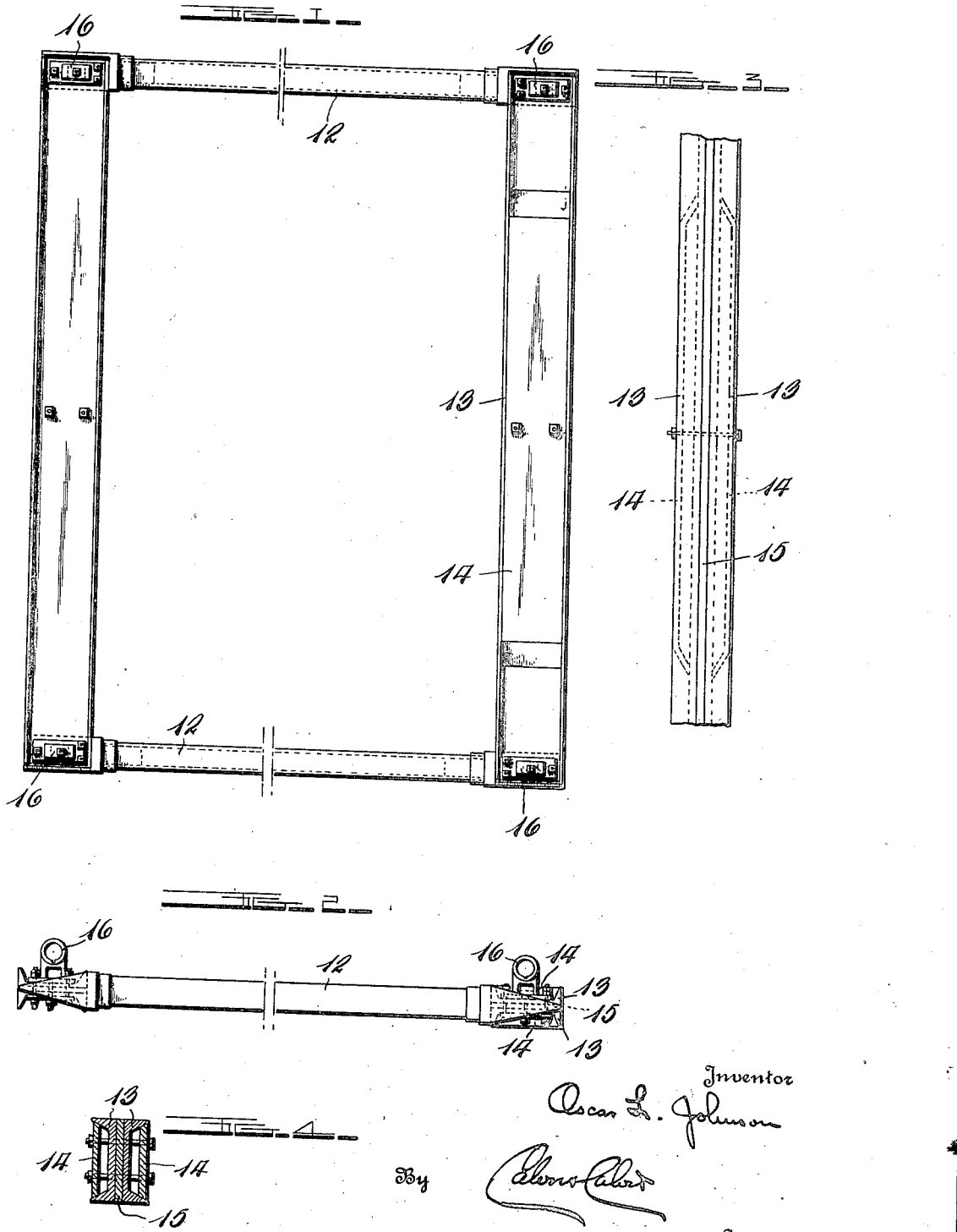

1,462,553

UNITED STATES PATENT OFFICE.

OSCAR L. JOHNSON, OF PROCTOR, VERMONT, ASSIGNOR TO VERMONT MARBLE COMPANY, A CORPORATION OF VERMONT.

GANG-SAW FRAME.

Application filed September 5, 1922. Serial No. 586,182.

*To all whom it may concern:*

Be it known that I, OSCAR L. JOHNSON, a citizen of the United States, residing at Proctor, in the county of Rutland and State of Vermont, have invented or discovered certain new and useful Improvements in Gang-Saw Frames, of which the following is a specification, reference being had therein to the accompanying drawings.

This invention relates to gang saw frames for stone sawing machines, and has for its object to provide a novel construction of the head blocks thereof whereby the said head blocks will be stiffened so as to add very materially to the durability of the frames. To this end the improved head blocks consist of channel bars, preferably of rolled steel, said channel bars being reinforced by steel webs welded at their sides to the flanges of the channel bars, said steel webs preferably having, between the ends of the channel bars, inwardly inclined ends which are also welded to the bottoms of the channel bars. These reinforced channel bars, in the head blocks, are preferably arranged back to back, and are preferably separated from each other and secured together by suitable bolts.

In the accompanying drawings Fig. 1 is a plan view of the improved gang saw frame and Fig. 2 is an edge view thereof. Fig. 3 is a partial edge view of one of the head blocks showing the reinforcing webs in dotted lines, and Fig. 4 is a central section of one of the head blocks.

Referring to the drawings, 12 denotes the side bars of the gang frame, and by which the head blocks or end pieces of the frame are suitably connected. Each of the said head blocks comprises two channel bars 13 preferably arranged back to back, as more clearly shown in Fig. 4, and to the flanges of each of the channel bars of the head block shown in Figs. 3 and 4 and at the right in Figs. 1 and 2 is welded a steel web 14, said webs extending throughout the greater part of the lengths of the said channel bars. The webs 14 are preferably constructed with inclined ends extending inward and welded to the bottom of the channel bars, as more clearly shown in Fig. 3. These reinforced channel bars are preferably separated from each other at their ends either by portions of the side bars 12 of the frame, or by suitable blocks placed between their ends, and said channel bars are also spaced apart from each other at their middle portions by plates 15. The channel bars composing the head blocks of the frame are bolted at their ends at the corners of the frame to the side bars 12, and also bolted together at their middle portions, as shown in Figs. 1 and 4. The swinging frame is provided at its corners with eye pieces 16 for the attachment of the means by which it is to be suspended.

By reinforcing the channel bars of the head blocks with the welded-in steel webs 14, head blocks of great strength and stiffness, but of comparative lightness, are provided, as will be understood; and owing to this reinforced construction the life of a gang saw frame is greatly lengthened.

In the construction shown one only of the head blocks is reinforced in the manner above described, as it is found in practice that one end only of the gang saw frame is likely to give trouble by breaking, but it will be obvious that both head blocks might be so constructed should such additional strength be found necessary or desirable.

Having thus described my invention, I claim and desire to secure by Letters Patent:

1. A gang saw frame for stone sawing machines having a head block consisting of channel bars spaced apart from each other and secured together and to the side bars of the frame, said channel bars being provided with reinforcing steel webs welded at their edges to the flanges of said channel bars.

2. A gang saw frame for stone sawing machines having a head block consisting of channel bars spaced apart from each other and secured together and to the side bars of the frame, said channel bars being provided with reinforcing steel webs welded at their edges to the flanges of said channel bars, said webs having inclined ends extending to the bottoms of said channel bars and welded to said bottoms.

In testimony whereof I affix my signature.

OSCAR L. JOHNSON.